US009055648B2

(12) United States Patent
Kondo et al.

(10) Patent No.: US 9,055,648 B2
(45) Date of Patent: Jun. 9, 2015

(54) LED LIGHTING SYSTEM, LED LAMP, AND ILLUMINATION SYSTEM FOR LED

(75) Inventors: Kazuyoshi Kondo, Yokohama (JP);
Ryosuke Matsui, Yokohama (JP);
Terutaka Muramatsu, Yokohama (JP);
Takashi Noguchi, Shizzuoka (JP); Ryo Suzuki, Yokohama (JP)

(73) Assignee: Osram GmbH, Munich (DE)

( * ) Notice: Subject to any disclaimer, the term of this patent is extended or adjusted under 35 U.S.C. 154(b) by 183 days.

(21) Appl. No.: 13/518,894

(22) PCT Filed: Dec. 13, 2010

(86) PCT No.: PCT/JP2010/072360
§ 371 (c)(1),
(2), (4) Date: Jun. 25, 2012

(87) PCT Pub. No.: WO2011/077987
PCT Pub. Date: Jun. 30, 2011

(65) Prior Publication Data
US 2012/0286668 A1    Nov. 15, 2012

(30) Foreign Application Priority Data
Dec. 25, 2009  (JP) .................................. 2009-294017

(51) Int. Cl.
*H01J 13/46* (2006.01)
*H05B 37/00* (2006.01)
(Continued)

(52) U.S. Cl.
CPC ................ *H05B 33/089* (2013.01); *F21K 9/17* (2013.01); *F21Y 2101/02* (2013.01); *F21Y 2103/003* (2013.01); *Y02B 20/341* (2013.01); *Y02B 20/386* (2013.01)

(58) Field of Classification Search
CPC .................................. H05B 37/02; G08B 17/00
USPC ........ 315/122, 244, 209 R, 185 R, 74, 91, 192, 315/289; 362/260, 223, 249.07, 287, 362/217.17, 227, 222, 225, 217; 340/815.4, 340/639.5, 639.9, 639.11, 628, 330, 331
See application file for complete search history.

(56) References Cited

U.S. PATENT DOCUMENTS 6,100,653 A * 8/2000 Lovell et al. .................. 315/307
7,507,001 B2 * 3/2009 Kit ................................ 362/276
(Continued)

FOREIGN PATENT DOCUMENTS

JP    2004303614 A    10/2004
JP    2008277188 A    11/2008
(Continued)

OTHER PUBLICATIONS

English Abstract of JP 2009004342 A.
(Continued)

*Primary Examiner* — Douglas W Owens
*Assistant Examiner* — Wei Chan

(57) ABSTRACT

The LED illumination system according to various embodiments is configured in such a manner that the LED lighting device is installed in an existing straight-tube fluorescent lamp luminaire, and the LED lamp is connected to the existing sockets. The characteristic of the output from the LED lighting device connected to either inter-terminal section A on the ends of the LED lamp is to be different from that of an existing fluorescent lamp lighting device. The LED lamp is provided with lighting device output detector for detecting the output from the LED lighting device and protector for cutting off the input to the LED lamp when the output detected by the lighting device output detector is outside of a predetermined range.

8 Claims, 7 Drawing Sheets

(51) Int. Cl.
*H05B 37/02* (2006.01)
*H05B 33/08* (2006.01)
*F21K 99/00* (2010.01)
*F21Y 101/02* (2006.01)
*F21Y 103/00* (2006.01)

(56) References Cited

U.S. PATENT DOCUMENTS

| | | | |
|---|---|---|---|
| 7,556,396 B2 * | 7/2009 | Kuo et al. | 362/217.01 |
| 7,938,562 B2 * | 5/2011 | Ivey et al. | 362/276 |
| 7,976,196 B2 * | 7/2011 | Ivey et al. | 362/294 |
| 8,653,984 B2 * | 2/2014 | Ivey et al. | 340/815.4 |
| 2006/0193131 A1 * | 8/2006 | McGrath et al. | 362/227 |
| 2006/0203482 A1 * | 9/2006 | Allen et al. | 362/227 |
| 2010/0033095 A1 * | 2/2010 | Sadwick | 315/51 |

FOREIGN PATENT DOCUMENTS

| | | |
|---|---|---|
| JP | 2009004342 A | 1/2009 |
| JP | 4328379 B1 | 9/2009 |
| JP | 3156000 U | 12/2009 |

OTHER PUBLICATIONS

English Abstract of JP 4328379 B1.
English Abstract of JP 2008277188 A.
English Abstract of JP 2004303614 A.

* cited by examiner

| No | Rmi (kΩ) | Rdi1 (kΩ) | Rdi2 (kΩ) | V0 (V) | Vi (V) |
|---|---|---|---|---|---|
| 1 | 18 | 90 | 15 | 100 | 8.33 |
| 2 | 18 | 90 | 15 | 141 | 11.75 |
| 3 | 15 | 90 | 15 | 100 | 7.69 |
| 4 | 15 | 90 | 15 | 141 | 10.85 |
| 5 | 12 | 90 | 15 | 100 | 6.90 |
| 6 | 12 | 90 | 15 | 141 | 9.72 |
| 7 | 1 Ω | 90 | 15 | 100 | 0.00 |
| 8 | 20 Ω | 90 | 15 | 100 | 0.02 |
| 9 | 100 Ω | 90 | 15 | 100 | 0.11 |
| 10 | 500 Ω | 90 | 15 | 100 | 0.53 |
| 11 | 100 | 90 | 15 | 100 | 12.66 |
| 12 | 1000 | 90 | 15 | 100 | 14.10 |
| 13 | 9.30 | 90 | 15 | 100 | 6.00 |
| 14 | 67.50 | 90 | 15 | 100 | 12.00 |
| 15 | 5.45 | 90 | 15 | 141 | 6.00 |
| 16 | 18.95 | 90 | 15 | 141 | 12.00 |

LED LIGHTING SYSTEM, LED LAMP, AND ILLUMINATION SYSTEM FOR LED

RELATED APPLICATIONS

The present application is a national stage entry according to 35 U.S.C. §371 of PCT application No.: PCT/JP2010/072360 filed on Dec. 13, 2010, which claims priority from Japanese application No.: 2009-294017 filed on Dec. 25, 2009.

TECHNICAL FIELD

The present invention relates to a LED illumination system of the type where a LED (Light Emitting Diode) lighting device is added to an existing straight-tube fluorescent lamp luminaire and a LED lamp is fitted into the existing sockets. The present invention also relates to the LED lamp and the LED lighting device which constitute the LED illumination system.

BACKGROUND TECHNOLOGY

FIG. 14 shows a conventional LED illumination system 400 described in e.g. Patent Document 1 and Patent Document 2. As shown in FIG. 14, in a conventional LED illumination system 400, a ballast 402 (fluorescent lamp lighting device) of an existing straight-tube fluorescent lamp luminaire 401 (hereinafter sometimes referred to merely as "luminaire") is removed and, in its stead, a LED lighting device 403 is installed. As to the wiring, input electric wires 404 from a commercial power supply to the ballast 402 and output electric wires 406 from the ballast 402 to two sockets 405 on both ends are directly connected to the LED lighting device 403. Furthermore, the conventional LED illumination system 400 comprises a LED lamp 407 (hereinafter sometimes referred to merely as "lamp") installed between the sockets 405, said LED lamp 407 having LEDs (Light Emitting Diodes), being constructed to have its end structure (bases, base pins, etc.), its dimensions, etc. matched to the whole length of a straight-tube fluorescent lamp, and, as a whole, assuming a shape similar to that of a straight-tube fluorescent lamp, so that it can be attached to two sockets 205 on both ends.

When a predetermined voltage is applied to the LED lighting device 403 from the commercial power supply via the input electric wires 404, electric power is supplied from the LED lighting device 403 to bases 407a and 407b on both ends of the LED lamp 407 via the sockets 405 on both ends. Then, the installed LEDs emit light and are used for illumination.

According to Patent Document 1, an adapter for identification is provided between the sockets 405 and the bases 407a, 407b. This adapter is inserted for the purpose of identifying a currently used straight-tube fluorescent lamp.

According to Patent Document 2, the bases 407a and 407b are insulated and used only for supporting the LED lamp 407, lead wires are provided seperately, and thus, the LED lighting device 403 and the LED lamp 407 are electrically connected.

In case of a straight-tube fluorescent lamp, both ends of filaments provided on both its ends must be further connected independently to the ballast 402 (fluorescent lamp lighting device). Therefore, two output electric wires 406 and two terminals in the socket 405 are needed on each side. Namely, four output electric wires and four terminals in the sockets are needed in total for both sides.

On the other hand, for the LED lamp 407, basically, two independent connections suffice. However, the LED lamp 407 shown in FIG. 14 is constructed by combining a straight-tube fluorescent lamp with an end structure (base, base pins, etc.). Herein, for example, one of the two base pins on one side is a dummy base pin. Thus, in the case where the LED lamp 407 is connected to the two output electric wires 406 and the two terminals in a socket 405 on each side, which totals four of each for both sides, it may in some cases not be possible to connect the LED lighting device 403 to the LED lamp 407, depending on the insertion direction.

As one example for preventing the above problem, electric power is supplied to both ends, and a short circuit is created in the LED lighting device 403 or the LED lamp 407 beforehand, so that the respective two of the four output electric wires that are connected to the same socket 405 are set to the same electric potential.

Since it is necessary to operate the LED with a direct current and in such a manner that the current is controlled, the above LED illumination system requires an AC-DC conversion means, a voltage conversion means and a current control means between the commercial power supply and the LED. Depending on how these means are allotted on the luminaire side and the lamp side, the following types emerge.

In the "First Type", almost all means are located on the luminaire side and a controlled direct current is supplied to the lamp side.

In the "Second Type", the AC-DC conversion is performed on the luminaire side and a voltage with an appropriate value is supplied to the lamp side, while the lamp side has the current control means.

In the "Third Type", the current passes through the luminaire side almost without stopping and the lamp side has almost all the functions.

PRIOR ART DOCUMENTS

Patent Documents

Patent Document 1: JP Pat. Appl. Publ. No. 2009-004342
Patent Document 2: JP Pat. Appl. Publ. No. 2004-303614

OUTLINE OF THE INVENTION

Problem to be Solved by the Invention

In the LED illumination system of this kind, the LED lamp 407 can be fitted to the original straight-tube fluorescent lamp luminaire 401 in which the ballast 402 (fluorescent lamp lighting device) has not been replaced with the LED lighting device 403. Conversely, the straight-tube fluorescent lamp can also be fitted after the ballast 402 is replaced with the LED lighting device 403. In case the lamp is thus mistakenly fitted, some characteristic problems occur as a matter of course. For example, no light is emitted, the light is dim, the lifetime becomes shorter, etc. Furthermore, in certain cases, phenomena which influence safety, such as components generating abnormal heat, may occur.

In case the LED lamp 407 is fitted to the straight-tube fluorescent lamp luminaire 401 in which the ballast 402 (fluorescent lamp lighting device) has not been replaced with the LED lighting device 403, the following phenomena occur for the "First Type" to the "Third Type":

(1) "First Type":
Since the LED lamp 407 does not have a special control circuit besides the LEDs, the LEDs burn out in a short time. During this process, the temperature rises abnormally and in some cases, there is a possibility of smoke emission and ignition.

(2) "Second Type" and "Third Type":
Though the current is controlled by the control circuit in the LED lamp 407, a voltage higher than a predetermined voltage may be applied and there is a possibility of smoke emission and ignition caused by the insulation breaking down.

On the other hand, when in the case where a straight-tube fluorescent lamp is fitted into the straight-tube fluorescent lamp luminaire 401 in which the ballast 402 has been replaced with the LED lighting device 403, a voltage is applied that exceeds the discharge voltage of the straight-tube fluorescent lamp, a discharge takes place in any of the above types. In the "Third Type", an overcurrent flows. In the "First Type" and the "Second Type", a too small DC current or an excessive DC current flows. Therefore, the lifetime becomes shorter and, in certain cases, the sockets 405, etc. can be damaged because of the temperature rise.

According to Patent Document 1, as a safety countermeasure, adapters are provided between the sockets 405 and the bases 407a, 407b in order to identify an existing straight-tube fluorescent lamp. When these adapters are integrally connected to the bases 407a and 407b, the lamp might be mistakenly attached as a LED lamp with adapters and the same problem as described above would occur. Thus, this countermeasure is not effective.

In Patent Document 2, the bases 407a and 407b are insulated and, therefore, the above safety problems are solved. However, Patent Document 2 has the disadvantage that it is necessary to bore holes into the straight-tube fluorescent lamp luminaire 401, through which lead wires for connecting the LED lighting device 403 provided inside the straight-tube fluorescent lamp luminaire 401 to the LED lamp 407 provided outside thereof, are allowed to pass.

The present invention is intended for solving the above problems. It provides a LED illumination system and a LED lighting device which do not cause heat generation and damage even when a straight-tube fluorescent lamp is mistakenly fitted into a straight-tube fluorescent lamp luminaire in which the fluorescent lamp ballast has been replaced with a LED lighting device. Further, the present invention provides a LED lamp which does not cause heat generation and damage even when it is mistakenly fitted into a straight-tube fluorescent lamp luminaire in which the fluorescent lamp ballast has not been replaced with a LED lighting device.

Means for Solving the Problem

The LED illumination system according to the present invention is a LED illumination system wherein a LED lighting device is installed in an existing straight-tube fluorescent lamp luminaire, input electric wires connected to a commercial power supply and output electric wires connected to existing sockets, all wires being connected to the existing fluorescent lamp lighting device, are removed and re-connected to the LED lighting device, and a LED lamp is connected to the sockets; wherein either inter-terminal section on the ends of the LED lamp is referred to as inter-terminal section A; the characteristic of an output from the LED lighting device connected to the inter-terminal sections A is different from that of the existing fluorescent lamp lighting device; and the LED lamp is provided with lighting device output detection means for detecting the output from the LED lighting device and also with protection means for cutting off an input to the LED lamp when the output detected by the lighting device output detection means is outside of a predetermined range.

In the LED illumination system according to the present invention, the impedance of the inter-terminal sections A of the LED lamp is different from the impedance of a fluorescent lamp, both in a normal state and at the end of its life; impedance detection means for directly or indirectly detecting the impedance of the inter-terminal sections A is provided on the side of the LED lighting device corresponding to the inter-terminal sections A; and, further, the LED lighting device is provided with protection means for cutting off the output of the LED lighting device when the impedance of the inter-terminal sections A detected by the impedance detection means is outside of a predetermined range.

The LED lamp according to the present invention is a LED lamp with a base provided with a pair of metal pins on each end of a slender rod-type body, inside which or on the surface of which LEDs are arranged in series; said LED lamp having the overall length specified in JIS C7617-2 and the base dimensions specified as G13 or G5 in JIS C7709-1, wherein either inter-terminal section on the ends is referred to as inter-terminal section A; the impedance of the inter-terminal sections A is different from the impedance of a fluorescent lamp, both in a normal state and at the end of its life; lighting device output detection means are provided for detecting an output from the LED lighting device, and protection means are provided for cutting off an input to the LED lamp when the output detected by the lighting device output detection means is outside of a predetermined range.

In the LED lamp according to the present invention, a resistor of 500Ω to 500 kΩ is provided between the two pins of the base of at least one end.

The LED lamp according to the present invention operates with a DC voltage or current from the LED lighting device, has detection means for detecting whether a voltage applied between the input terminals is an alternating current or a direct current, and has protection means for cutting off if it is an alternating current.

The LED lamp according to the present invention has detection means for an applied voltage of the inter-terminal sections A connected to the resistors, and protection means for cutting off if the applied voltage deviates from a voltage calculated from a current made to flow by the LED lighting device and from any resistance value in the range of the resistor.

The LED lighting device according to the present invention has output terminals connected to the bases of the LED lamp; at least part of the output from the output terminals is different from an output of a fluorescent lamp lighting device; it has impedance detection means for measuring the impedance between the terminals of the LED lamp; and it has a protection means for cutting off the output if the impedance between the terminals of the LED lamp detected by the impedance detection means is outside of a predetermined range.

The LED lighting device according to the present invention outputs an output with a voltage varying depending on a fixed current or a load, at least at the time when it is activated, between at least one pair of terminals connected to a socket, and has detection means for the voltage between the terminals and protection means for cutting off the output if the voltage between the terminals detected by the detection means is outside of a predetermined range.

Effect of the Invention

The LED illumination system according to the present invention is configurated in such a manner that either inter-terminal section on the ends of the LED lamp is referred to as inter-terminal section A; the characteristic of an output from the LED lighting device connected to the inter-terminal sections A is different from that for the existing fluorescent lamp lighting device; and the LED lamp is provided with lighting device output detection means for detecting the output from the LED lighting device and also with protection means for cutting off an input to the LED lamp when the output detected by the lighting device output detection means is outside of a predetermined range. Therefore, if this LED lamp is mistakenly attached to a normal fluorescent lamp luminaire, the output to the inter-terminal section A is detected and the input is cut off by the protection means, so that heat generation and smoke emission can be prevented from occurring.

The LED illumination system according to the present invention is configured in such a manner that the impedance of the inter-terminal section A of the LED lamp is different from the impedance of a fluorescent lamp, both in a normal state and at the end of its life; impedance detection means for directly or indirectly detecting the impedance of the inter-terminal sections A are provided on the side of the LED lighting device corresponding to the inter-terminal sections A; and, further, the LED lighting device is provided with protection means for cutting off the output of the LED lighting device when the impedance of an inter-terminal section A detected by the impedance detection means is outside of a predetermined range. Therefore, if a fluorescent lamp is mistakenly attached to this luminaire with a LED lighting device, the LED lighting device detects the impedance of the inter-terminal section A and the detected impedance is outside of the range of the impedance set for the inter-terminal section A of the LED lamp. Hence, the output to the lamp is cut off by the protection means, so that heat generation and smoke emission can be prevented from occurring.

The LED lamp according to the present invention is a LED lamp that is interchangeable with a fluorescent lamp from the viewpoint of its size, and is configured in such a manner that either inter-terminal section on the ends is referred to as inter-terminal section A; the impedance of the inter-terminal sections A is different from the impedance of a fluorescent lamp, both in a normal state and at the end of its life; lighting device output detection means are provided for detecting an output from the LED lighting device, and protection means are provided for cutting off an input to the LED lamp when the output detected by the lighting device output detection means is outside of a predetermined range. Therefore, if this LED lamp is mistakenly attached to a luminaire which still has a fluorescent lamp lighting device, the input is detected and the detection result is outside of the predetermined range. Hence, the output to the lamp is cut off by the protection means, so that heat generation and smoke emission can be prevented from occurring. Further, this impedance is used to allow the LED lighting device side to judge whether or not the lamp is a LED lamp.

The LED lamp according to the present invention is configurated in such a manner that a resistor of 500Ω to 500 kΩ is provided between the two pins of the base on at least one end. Therefore, the LED lighting device can judge whether or not the lamp is a LED lamp by detecting the resistance value. Furthermore, the voltage across the impedance, etc., which is determined by the output from the LED lighting device to the inter-terminal section A and the above impedance, is detected on the side of the LED lamp, thus making it possible to judge whether or not the lamp is a LED lamp.

The LED lamp according to the present invention is configurated in such a manner that it operates with a DC voltage or current from the LED lighting device, has detection means for detecting whether a voltage applied between the input terminals is an alternating current or a direct current, and has protection means for cutting off if it is an alternating current. Since a fluorescent lamp lighting device uses an alternating current, an alternating current is detected if this LED lamp is mistakenly connected to a fluorescent lamp lighting device, and a cutting-off is performed, so that heat generation and smoking can be prevented from occurring.

The LED lamp according to the present invention is configurated in such a manner that it has detection means for an applied voltage of the inter-terminal sections A connected to resistors, and protection means for cutting off if the applied voltage deviates from a voltage calculated from a current made to flow by the LED lighting device and from any resistance value in the range of the resistor. Therefore, if the LED lamp is connected to a fluorescent lamp lighting device, the voltage is outside of the range. Then, this voltage is detected and a cutting-off is performed, so that heat generation and smoke emission can be prevented from occurring.

The LED lighting device according to the present invention is configurated in such a manner that it has output terminals connected to the base of the LED lamp; at least part of the output from the output terminals is different from an output of a fluorescent lamp lighting device; it has impedance detection means for measuring the impedance between the terminals of the LED lamp; and it has protection means for cutting off the output if the impedance between the terminals of the LED lamp detected by the impedance detection means is outside of a predetermined range. Therefore, if a fluorescent lamp is mistakenly attached, this impedance is measured and it is outside of the range of the impedance determined for a LED lamp. Hence, a cutting-off is performed by the protection means, so that heat generation and smoke emission can be prevented from occurring.

The LED lighting device according to the present invention is configurated in such a manner that it outputs an output with a voltage varying depending on a fixed current or a load, at least at the time when it is activated, between at least one pair of terminals connected to a socket, and which has detection means for the voltage between the terminals and protection means for cutting off the output if the voltage between the terminals detected by the detection means is outside of a predetermined range. Therefore, if a fluorescent lamp is connected, the voltage is outside of the predetermined range. Then, this voltage is detected and a cutting-off is performed, so that heat generation and smoke emission can be prevented from occurring.

MODES FOR CARRYING OUT THE INVENTION

Embodiment 1

(Outline)

In the LED illumination system according to the present embodiment, the ballast (fluorescent lamp lighting device) of the existing straight-tube fluorescent lamp luminaire is removed, or the input electric wires of the commercial power supply which are connected to the ballast and the output electric wires which are connected to the sockets, are removed. Then, the LED lamp lighting device for lighting an LED lamp is attached, and the input electric wires of the commercial power supply and the output electric wires connected to the sockets are re-connected to the LED lamp lighting device for lighting. To this existing straight-tube fluorescent lamp luminaire in which the ballast (fluorescent lamp lighting device) has been replaced with the LED lamp lighting device, a safe LED lamp to which protection devices, etc. have been added, is attached. As to the LED lamp according to the present embodiment, even when it e.g. is mistakenly attached to an existing straight-tube fluorescent lamp luminaire in which the ballast (fluorescent lamp lighting device) has not been replaced with the LED lamp lighting device, there is no possibility of burnout, smoke emission or ignition, which would take place in case of a conventional LED lamp. Furthermore, in case a straight-tube fluorescent lamp is mistakenly attached to the LED lamp lighting device according to the present embodiment, the LED lamp lighting device measures the impedance of the straight-tube fluorescent lamp and cuts off the connection to the straight-tube fluorescent lamp through the protection means if the impedance of the straight-tube fluorescent lamp is outside of the range of the impedance determined for the LED lamp.

Figure 1:
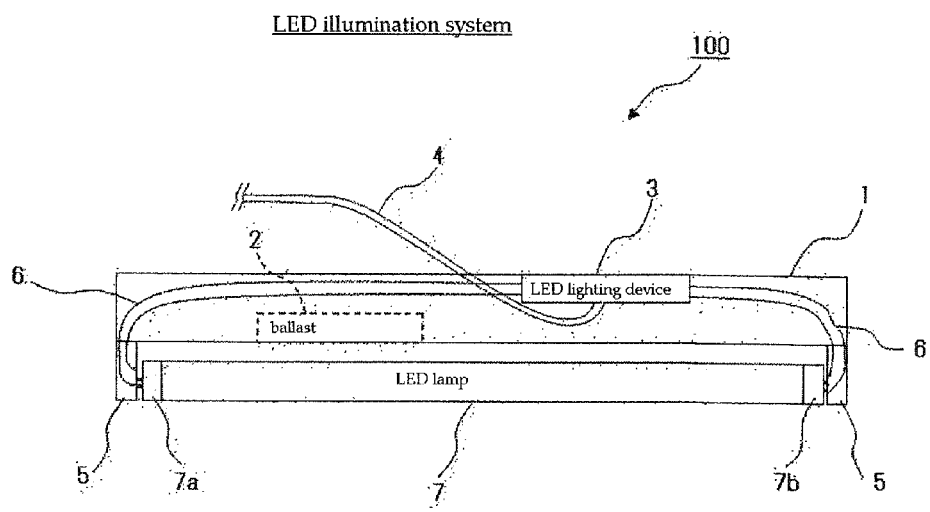
FIG. 1 shows Embodiment 1 and it shows a LED illumination system 100.
Figure 2:
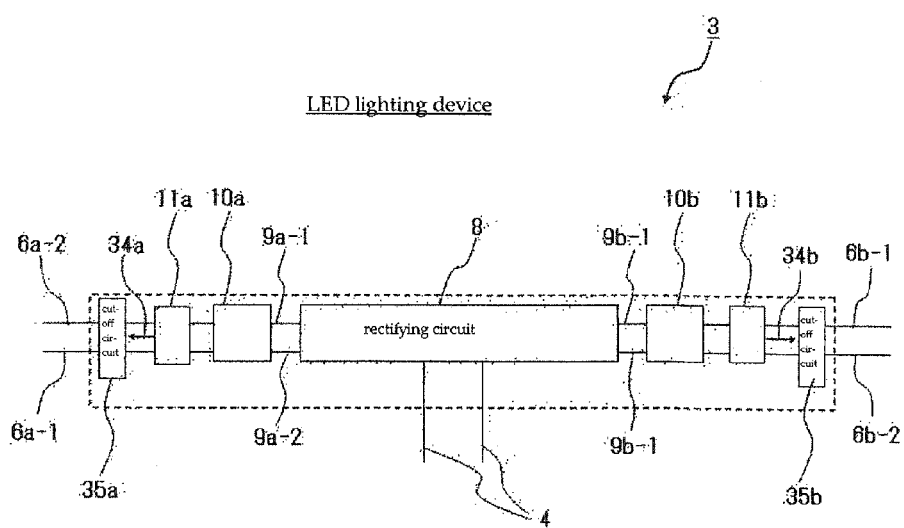
FIG. 2 shows Embodiment 1 and is a block diagram showing the circuit arrangement of a LED lighting device 3.
Figure 3:
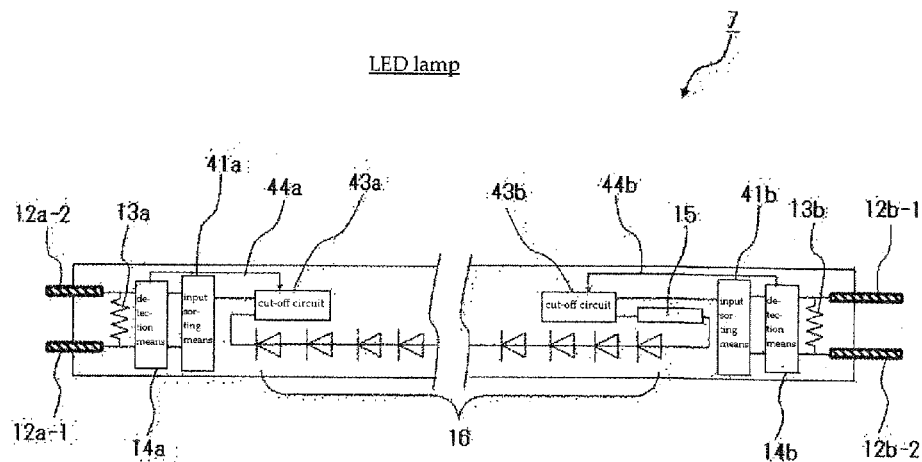
FIG. 3 shows Embodiment 1 and it shows the schematic structure of a LED lamp 7.
Figure 4:
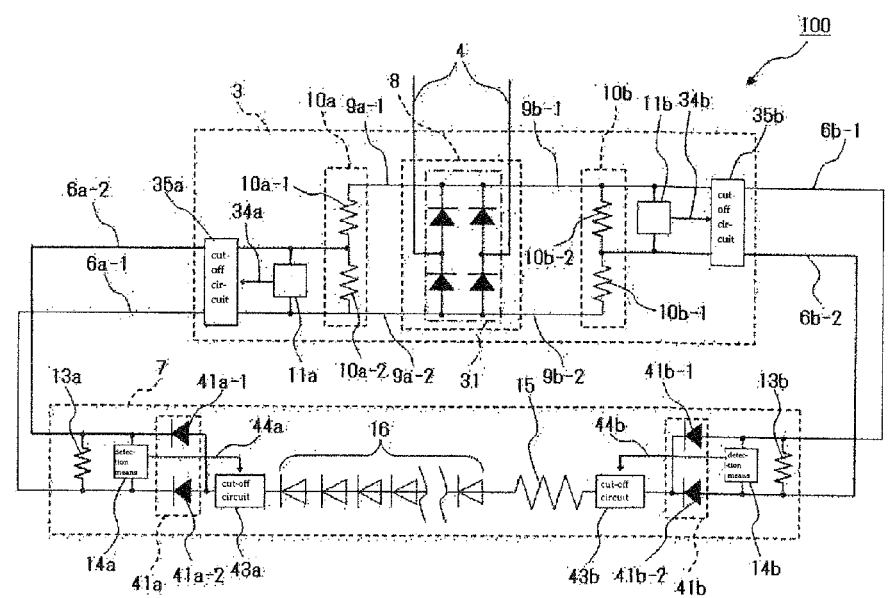
FIG. 4 shows Embodiment 1 and is a schematic circuit drawing showing the whole LED illumination system 100.
Figures 5, 6:
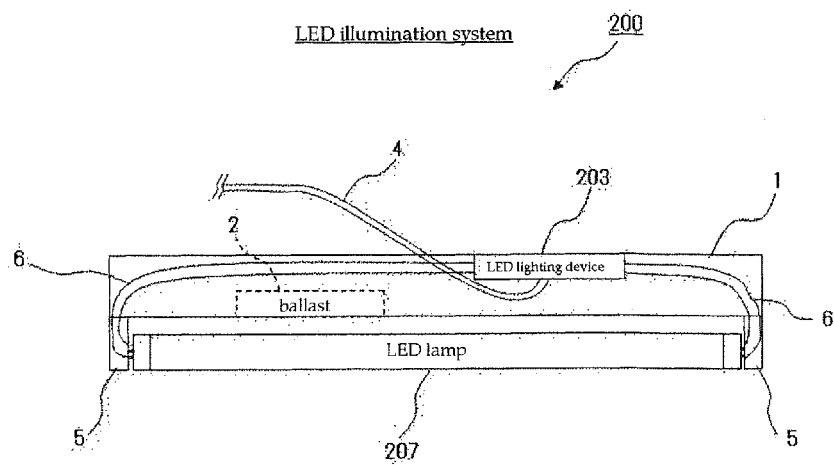
FIG. 5 shows Embodiment 1 and it shows the results of a calculation of voltages Vi across measuring resistors 13a and 13b, calculated corresponding to the measuring resistors 13a and 13b.
FIG. 6 shows Embodiment 2 and it shows a LED illumination system 200.

FIGS. 1-5 show Embodiment 1. FIG. 1 shows the LED illumination system 100, FIG. 2 is a block diagram showing the circuit arrangement of the LED lighting device 3, FIG. 3 shows the schematic structure of the LED lamp 7, FIG. 4 is a schematic circuit diagram showing the whole LED illumination system 100, and FIG. 5 shows the results of a calculation of voltages Vi across the measuring resistors 13a and 13b, calculated corresponding to the measuring resistors 13a and 13b.

As shown in FIG. 1, the LED illumination system 100 is configured in such a manner that the LED lighting device 3 is installed in the existing straight-tube fluorescent lamp luminaire 1; the input electric wires 4 which are connected to the commercial power supply and to the existing ballast 2 (fluorescent lamp lighting device), and the in total four output electric wires 6 which are connected between the ballast 2 and the sockets 5, are removed and re-connected to the LED lighting device 3; and the LED lamp 7 (hereinafter sometimes referred to merely as "lamp") is connected to the existing sockets 5.

At this time, the ballast 2 (fluorescent lamp lighting device) can be either removed from the straight-tube fluorescent lamp luminaire 1, or left as it is.

The LED lamp 7 has a plurality of LEDs and is constituted in such a manner that its end structure (bases, base pins, etc.), its dimensions, etc. are matched to the whole length of a straight-tube fluorescent lamp, and, as a whole, it assumes a shape similar to that of a straight-tube fluorescent lamp, so that it can be attached to two sockets 5 on both ends.

The LED lamp 7 comprises bases 7a, 7b with pairs of metal pins (a pair of pins 12a-1, 12a-2 and a pair of pins 12b-1, 12b-2 (see FIG. 3)) on both ends of the slender rod-type body structure inside which or on the surface of which LEDs 16 are arranged in series. The LED lamp 7 also has the total length specified in JIS C7617-2 and the base dimensions specified as G13 or G5 in JIS C7709-1.

Unlike straight-tube fluorescent lamps, the LED lamp 7 does not use a filament. Therefore, basically, one pin (base pin) on each side, which totals two pins for both sides, suffice. However, in order to achieve a structure similar to that of a straight-tube fluorescent lamp, the LED lamp 7 is provided with two pins (base pins) on each side, meaning four pins in total. The details of the LED lamp 7 will be explained later.

As shown in FIG. 2, the LED lighting device 3 is constituted in such a manner that, for example, the input electric wires 4 accommodating an AC of 100 V are initially connected to a rectifying circuit 8. Then, the input is converted into a direct current and outputted to intermediate output electric wires 9a-1, 9a-2, 9b-1 and 9b-2 on both sides in FIG. 2.

The rectifying circuit 8 comprises, as shown e.g. in FIG. 4, a diode bridge 31 performing full-wave rectification and a not illustrated smoothing circuit, thus outputting a direct current to output electric wires 6b-1, 6a-1, etc. The output electric wires 6b-1 and 6a-1 supply electric power to the LED lamp 7 via the sockets 5.

As shown e.g. in FIG. 4, a connection judging signal generator 10a comprises voltage-dividing resistors 10a-1 and 10a-2, while a connection judging signal generator 10b comprises voltage-dividing resistors 10b-1 and 10b-2. The connection judging signal generator 10a outputs a divided DC voltage to the pair of output electric wires 6a-1, 6a-2, while the connection judging signal generator 10b outputs a divided DC voltage to the pair of output electric wires 6b-1, 6b-2.

The connection judging signal generators 10a and 10b are connected in parallel with the positive pole (the upper side in FIG. 4) and the negative pole (the lower side in FIG. 4) of the diode bridge 31. In the connection judging signal generator 10a, the voltage-dividing resistor 10a-1 is connected to the positive pole side of the diode bridge 31, while the voltage-dividing resistor 10a-2 is connected to the negative pole side of the diode bridge 31. In the connection judging signal generator 10b, the voltage-dividing resistor 10b-2 is connected to the positive pole side of the diode bridge 31, while the voltage-dividing resistor 10b-1 is connected to the negative pole side of the diode bridge 31.

On the other hand, a voltage measurement and cut-off signal generation circuit 11a (impedance detection means) connected in parallel with the voltage-dividing resistor 10a-2 of the connection judging signal generator 10a measures the voltage between the output electric wires 6a-1 and 6a-2. If this voltage is outside of the predetermined range (described later), the voltage measurement and cut-off signal generation circuit 11a sends a cut-off signal via a signal line 34a to a cut-off circuit 35a (protection means). The cut-off circuit 35a then cuts off the connection to the output electric wires 6a-1 and 6a-2.

Furthermore, the voltage measurement and cut-off signal generation circuit 11b (impedance detection means) connected in parallel with the voltage-dividing resistor 10b-2 of the connection judging signal generator 10b measures the voltage between the output electric wires 6b-1 and 6b-2. If this voltage is outside of the predetermined range (described later), the voltage measurement and cut-off signal generation circuit 11b sends a cut-off signal via a signal line 34b to a cut-off circuit 35b (protection means). The cut-off circuit 35b then cuts off the connection to the output electric wires 6b-1 and 6b-2. Since the measured voltages depend on the impedance of the measuring resistors provided in the LED lamp 7, this means that the impedance is measured indirectly.

According to this example, the voltage measurement circuit portions of the voltage measurement and cut-off signal generation circuits 11a and 11b are designed to measure a time-averaged DC voltage of more than 50 Hz. In case of an AC voltage, 0 V is measured. Furthermore, according to one example, in order to avoid the influences of noise, transitional changes, etc., the average is taken for a long period of time of about 0.5 seconds. As to the cut-off circuits 35a and 35b, they e.g. once perform a cut-off, are retained in this state until the power supply is turned off, and when the power supply is turned on next time, they are reset and put in the conductive state. According to another example, a reset switch may be provided and the cut-off state held until the reset switch is pushed. This LED lighting device 3 outputs the electric power which is outputted to each socket 5 and allows the LEDs to emit light, to one of the two output electric wires 6a-1, 6a-2 and one of the output electric wires 6b-1, 6b-2; in FIG. 4 the output electric wires 6a-1 and 6b-1.

As shown in FIG. 3, the LED lamp 7 comprises one pair of pins (the pair of pins 12a-1, 12a-2 and the pair of pins 12b-1, 12b-2) on each end, which totals four pins 12a-1, 12a-2, 12b-1 and 12b-2. They can be connected to the sockets 5 on the side of the luminaire to support the LED lamp 7.

The conditions for fitting into the straight-tube fluorescent lamp luminaire 1, such as the dimensions of the tube end portions including the pins 12a-1, 12a-2, 12b-1, 12b-2, the whole length of the lamp, etc. are described in JIS C7617-1 or -2 which specify straight-tube fluorescent lamps, and in JIS C7709-1 which specifies bases. These conditions are fulfilled.

The pins 12a-1 and 12a-2 are each connected to one end of the impedance, i.e. the measuring resistor 13a in this example. Similarly, the pins 12b-1 and 12b-2, too, are each connected to one end of the measuring resistor 13b.

Moreover, the measuring resistors 13a and 13b are connected in parallel to detection means 14a and 14b (lighting device output detection means) of the LED lighting device 3, respectively. The detection means 14a and 14b are e.g. voltmeters and, in this case, they indirectly measure the output or the output characteristic of the LED lighting device. In case the output deviates from a predetermined voltage range corresponding to a predetermined output of the LED lighting device, the cut-off signal for cutting off the electric power is generated and supplied to the cut-off signal lines 44a and 44b. In this case, the sections between the pins 12a-1 and 12a-2 and between the pins 12b-1 and 12b-2 are referred to as inter-terminal section A, respectively.

As to input sorting circuits 41a and 41b, as shown in e.g. FIG. 4, the input sorting circuit 41a comprises two diodes 41a-1, 41a-2, while the input sorting circuit 41b comprises two diodes 41b-1, 41b-2.

The electric power for allowing the LED to emit light, which is supplied from the LED lighting device 3, is outputted to one of the pins 12a-1, 12a-2 or one of the pins 12b-1, 12b-2. In any case, the electric power is properly supplied to the LED.

At the end on the right side of FIG. 4, the output electric wire 6b-1 is the line supplying the electric power. Here, the voltage in the output electric wire 6b-1 is higher than that in the output electric wire 6b-2 due to the voltage-dividing resistors 10b-1 and 10b-2. Therefore, the voltage becomes higher in a diode 41b-1 than in a diode 41b-2, so that the former (diode 41b-1) is in the conductive state and the latter (diode 41b-2) is in the cut-off state. Thus, the output electric wire 6b-1 is connected to the cut-off circuit 43b.

On the other hand, the diode 41b-2 is cut-off from the output electric wire 6b-1 and therefore does not influence the connection from the output electric wire 6b-2 to the detection means 14b.

The path through which the current flows in the LED illumination system 100 in FIG. 4 leads from the positive pole (the upper side in FIG. 4) of the diode bridge 31 to the cut-off circuit 35b, the output electric wire 6b-1, the diode 41b-1, the cut-off circuit 43b, a current control circuit 15, a plurality of light emitting diodes 16, the cut-off circuit 43a, the diode 41a-2, the detection means 14a, the output electric wire 6a-1, the cut-off circuit 35a, and the negative pole (the lower side in FIG. 4) of the diode bridge 31.

In the LED illumination system 100 in FIG. 4, the LED lamp 7 may be fitted in reverse in front-back-direction (the vertical direction in FIG. 4) with regard to the direction of the LED lamp 7 in FIG. 4. In this case, the path through which the current flows leads from the positive pole (the upper side in FIG. 4) of the diode bridge 31 to the cut-off circuit 35b, the output electric wire 6b-1, the diode 41b-1, the cut-off circuit 43b, the current control circuit 15, the plurality of diodes 16, the cut-off circuit 43a, the diode 41a-1, the detection means 14a, the output electric wire 6a-1, the cut-off circuit 35a, and the negative pole (the lower side in FIG. 4) of the diode bridge 31.

In the LED illumination system 100 in FIG. 4, the state of the LED lamp 7 in left-right-direction is limited to one direction. In case the LED lamp 7 is fitted in reverse left-right-direction, the electric potential in the LED lighting device 3 in FIG. 4 becomes higher on the right side than on the left side. Therefore, the current does not flow through the LED lamp 7 and the LED lamp 7 is not lit.

According to this example, the detection means 14a and 14b are designed to measure a time-averaged DC voltage of more than 50 Hz. In case of an AC voltage, 0 V is measured. Furthermore, according to one example, in order to avoid the influences of noise, transitional changes, etc., the average is taken for a long period of time of about 0.5 seconds.

In case the cut-off signals from the detection means 14a and 14b are sent via the cut-off signal lines 44a and 44b, the cut-off circuits 43a and 43b (protection means) cut off the electric power sent from the output electric wires 6a-1 and 6b-1. The current control circuit 15 and the plurality of light emitting diodes 16 are connected in series and control is executed to realize an appropriate current so that the light emitting diodes 16 emit light properly. In one example, the current control circuit 15 is a resistor. In order to further stabilize the emission output, it may also be a fixed current circuit.

The cut-off circuits 43a and 43b are designed so that they e.g. once perform a cut-off, are retained in this state until the power supply is turned off, and when the power supply is turned on next time, they are reset and put in the conductive state. According to another example, a reset switch may be provided and the cut-off state held until the reset switch is pushed.

One example will be concretely explained showing a LED luminaire adapted to an overall lamp length of 1198 mm, to which FLR40S, FL40S, FL40SS/37, FHF32, etc. specified in JIS C7617-2 can be attached.

The LED lighting device 3 outputs a connection judging signal from the connection judging signal generators 10a and 10b to at least one pair of the in total four output electric wires 6a-1, 6a-2, 6b-1, 6b-2; for example in FIG. 2 or FIG. 4, the pair of output electric wires 6a-1, 6a-2 and the pair of output electric wires 6b-1, 6b-2, each pair being connected to a socket 5 on the same end. From the connection judging signal generator 10a, the connection judging signal is outputted to the pair of output electric wires 6a-1 and 6a-2. Furthermore, from the connection judging signal generator 10b, the connection judging signal is outputted to the pair of output electric wires 6b-1 and 6b-2.

The connection judging signal generator 10a is, for example, a circuit where the output impedance of a direct current generated by the voltage-dividing resistors 10a-1 and 10a-2 generates a limited voltage. That the output impedance is limited means that the generated voltage changes depending on the impedance of the circuit connected to the output side.

The connection judging signal generator 10b is, for example, a circuit where the output impedance of a direct current generated by the voltage-dividing resistors 10b-1 and 10b-2 generates a limited voltage.

For example, with the power supply being an AC of 100 V, the voltage-dividing resistors 10a-1, 10a-2, 10b-1, 10b-2 are 90 kΩ, 15 kΩ, 90 kΩ, and 15 kΩ, respectively (referred to as Rd11, Rd12, Rd21, and Rd22, respectively). Namely, Rd11 (voltage-dividing resistor 10a-1)=90 kΩ
Rd12 (voltage-dividing resistor 10a-2)=15 kΩ
Rd21 (voltage-dividing resistor 10b-1)=90 kΩ
Rd22 (voltage-dividing resistor 10b-2)=15 kΩ

The measuring resistors 13a and 13b of the normal LED lamp 7 are 15 kΩ±3 kΩ (referred to as Rm1 and Rm2, respectively). Namely, Rm1 (measuring resistor 13a)=15 kΩ±3 kΩ
Rm2 (measuring resistor 13b)=15 kΩ±3 kΩ

The voltage range where the voltage measurement and cut-off signal generation circuits 11a, 11b and the detection means 14a, 14b of the LED lamp 7 do not generate a cut-off signal, is set to 6.0 V-12.0 V.

Furthermore, the voltage V0 outputted by the rectifying circuit 8 changes, due to the load, from 100 V to 141 V in case it is a smoothing circuit comprising a full-wave rectification circuit of four diodes, and a simple capacitor. In this case, the voltages V1 and V2 across the measuring resistors 13a and 13b are as follows:

$$Vi = V0 \times [1/(1/Rmi+1/Rdi2)]/[Rdi1+\{1/(1/Rmi+1/Rdi2)\}]$$

Here, i is 1 or 2, which correspond to the left and right circuit, respectively. An example where this calculation was performed corresponding to the maximum value, the center value and the minimum value (18 kΩ, 15 kΩ, 12 kΩ) of the measuring resistors 13a and 13b, is shown in FIG. 5.

As shown in FIG. 5, No. 1-No. 6 are the results of calculations of the in total six combinations, namely of the above three values of the measuring resistors 13a and 13b (18 kΩ, 15 kΩ, 12 kΩ) and the two cases of 141 V and 100 V, which are the maximum and minimum values of the voltage V0 outputted by the rectifying circuit 8. FIG. 5 shows that the voltage Vi is in the range from 6.90 V to 11.75 V. Therefore, it falls within the range from 6.0 V to 12.0 V where the LED lighting device 3 and the LED lamp 7 are not cut off. Since no cut-off signal is generated, the respective cut-off circuits 35a, 35b and 43a, 43b do not break the circuits, so that in the end, electric power is fed to the LEDs 16 and they emit light.

An explanation will be made as to the case where a straight-tube fluorescent lamp is mistakenly fitted to the straight-tube fluorescent lamp luminaire 1 to which the LED lighting device 3 according to Embodiment 1 is attached. In the normal state, the resistance on one end of the straight-tube fluorescent lamp (the resistance between the two base pins, i.e. the resistance of the filament) is about 1.5Ω-4Ω, at its maximum at most 100Ω, at room temperature and about five times that when a current flows and the temperature rises. Thus, the overall resistance is 1.5Ω to 500Ω.

On the other hand, in an abnormal state, the resistance may be ∞Ω or at least 500Ω in case the filament has burnt out due to e.g. it being at the end of its life, or the resistance may be 0Ω or at most 0.5Ω in an abnormal case of short-circuiting, including the end of life. Thus, in the normal and abnormal states, the possible resistance ranges from 0Ω to 500Ω or is at least 500 kΩ.

No. 7-No. 12 in FIG. 5 show the results of calculations of the voltages Vi (i is 1 or 2) across the measuring resistors 13a and 13b when the measuring resistance Rmi is varied from 1Ω to 20Ω, 100Ω, 500Ω, 100 kΩ, and 1000 kΩ, under the conditions that Rdi1=90 kΩ, Rdi2=15 kΩ and the voltage V0 outputted by the rectifying circuit 8=100 V.

As described above, in the normal and abnormal states of the straight-tube fluorescent lamp, the possible resistance values are either in the range from 0Ω to 500Ω or at least 500 kΩ. The voltage V1 or V2 across the measuring resistor 13a or 13b at this time is as follows:

(1) In case of the range from 0Ω to 500Ω (normal state):
  at most 0.53 V (from No. 7-No. 10 in FIG. 5)
(2) In case of at least 500 kΩ (abnormal state):
  at least 12.66 V (from Nos. 11 and 12 in FIG. 5)

The above ranges (1) and (2) deviate from the voltage range of 6.0 V-12.0 V where the voltage measurement and cut-off signal generation circuits 11a, 11b of the LED lighting device 3 do not generate a cut-off signal. Therefore, the voltage measurement and cut-off signal generation circuits 11a, 11b of the LED lighting device 3 generate the cut-off signal, so that the cut-off circuits 35a, 35b break the circuits and the output to the straight-tube fluorescent lamp is cut off.

As described above, in case a straight-tube fluorescent lamp is mistakenly fitted to the straight-tube fluorescent lamp luminaire 1 to which the LED lighting device 3 is attached, the cut-off circuits 35a, 35b of the LED lighting device 3 break the output circuit. Thus, accidents such as heat generation or smoke emission do not occur.

No. 13-No. 16 in FIG. 5 show the results of calculations of the measuring resistance Rmi, wherein the minimum value (6.0 V) and the maximum value (12.0 V) of the range from 6.0 V to 12.0 V where the voltage measurement and cut-off signal generation circuits 11a, 11b of the LED lighting device 3 do not generate a cut-off signal, are achieved. The calculations are performed for: Rdi1=90 kΩ, Rdi2=15 kΩ, and the voltage V0 outputted by the rectifying circuit 8=100 V, 141 V. When the voltage V0=100 V, the measuring resistance Rmi for realizing the voltage Vi=6.0 V is 9.3 kΩ, and the measuring resistance Rmi for realizing the voltage Vi=12.0 V is 67.5 kΩ. Furthermore, when the voltage V0=141 V, the measuring resistance Rmi for realizing the voltage Vi=6.0 V is 5.45 kΩ, and the measuring resistance Rmi for realizing the voltage Vi=12.0 V is 18.95 kΩ.

When the normal state changes into the abnormal state, the range from 500Ω to 500 kΩ may be observed for a short period of time. However, this value changes to at most 500Ω or at least 100 kΩ during this short period of time, and therefore, the current is cut off for a short period of time. Thus, for the resistance value which the straight-tube fluorescent lamp can assume, the range from 500Ω to 500 kΩ can be excluded.

Actually, in this example, in case Rdi1 is 90 kΩ, only a current of (at most) about 100[V]/90,000[Ω]=0.001[A] flows through the filament of the straight-tube fluorescent lamp. Therefore, the temperature of the filament of the straight-tube fluorescent lamp hardly rises, and the possible resistance range for the straight-tube fluorescent lamp as a whole becomes narrower. Thus, even if the minimum value is set to 50Ω-100Ω, it is actually very likely that no problems will occur. On the other hand, if the filament of the straight-tube fluorescent lamp breaks, the maximum value of the resistance is at least a few MΩ. It is very likely that no problems will occur until about 1 MΩ is reached.

Namely, the optimum resistance value ranges of the measuring resistors 13a, 13b (Rm1, Rm2) in both the normal and abnormal states of the straight-tube fluorescent lamp are from 0Ω to 500Ω and at least 500 kΩ, as described above. (When the normal state changes into the abnormal state, the range from 500Ω to 500 kΩ may be observed for a short period of time. However, this value changes to at most 500Ω or at least 100 kΩ during this short period of time, and therefore, the current is cut off for a short period of time. Thus, this case is excluded.) Therefore, while the range of 500Ω to 500 kΩ differs from the above ranges, the resistance value range may be approximately 50Ω to 1 MΩ.

An explanation will be made as to the case where the LED lamp 7 of Embodiment 1 is mistakenly attached to the unconverted straight-tube fluorescent lamp luminaire 1. The output to the pair of terminals for each socket 5 of the straight-tube fluorescent lamp luminaire 1 is an alternating current with a commercial frequency or a high frequency for all lamps of a glow tube type, rapid type and inverter type. However, the detection means 14a, 14b of the present LED lamp 7 detect a value only for a voltage of a direct current and measure 0 V in case of an alternating current.

Since the voltage range where the detection means 14a, 14b do not generate cut-off signals is from 6.0 V to 12.0 V, the detection means 14a, 14b generate cut-off signals which are sent to the cut-off circuits 43a, 43b, and the electric power is cut off. The cut-off signals from the detection means 14a, 14b are sent through the cut-off signal lines 44a, 44b to the cut-off circuits 43a, 43b which cut off the electric power sent through the output electric wires 6a-1, 6b-1.

As described above, in case the LED lamp 7 is attached to the unconverted straight-tube fluorescent lamp luminaire 1, the LED lamp 7 breaks the circuit and the voltage/current are cut off. Therefore, accidents such as heat generation and smoke emission do not occur.

Immediately after the LED lighting device 3 is connected to the power supply, it may be put into the conductive state in which the electric power can be fed between the output electric wires 6a-1 and 6b-1 and on to the LEDs of the LED lamp 7, the voltage, etc. checked and judged, and in case it is outside of the range, the electric power cut off. Alternatively, immediately after the connection to the power supply is made, both the LED lighting device 3 side and the LED lamp 7 side may be put in the cut-off state, the voltage, etc. checked, and after it is judged to be out of the range, the conductive state realized. Although in the latter case, it takes some time until the lamp emits light after it is switched on, it is safer. As the concrete operation, first, both cut-off circuits 43a and 43b on the LED lamp 7 side are put in the cut-off state, and one of the cut-off circuits 35a and 35b on the LED lighting device 3 side, e.g. the cut-off circuit 35a, is put in the conductive state. After the judgment, the other cut-off circuit 35b is put in the conductive state and further checking is performed on the LED lamp 4 side. The reason why only one of the cut-off circuits 35a and 35b on the LED lighting device 3 side is opened at the beginning, is: The cut-off circuits 35a and 35b must be put in the conductive state for performing the checking. However, if they are put in the conductive state at the same time, a current flows temporarily if a lamp other than the predetermined LED lamp 7 is mistakenly attached. The above prevents problems from occuring at this time.

According to the example explained in connection with Embodiment 1, a voltage measurement and cut-off signal generation circuit 11a, 11b and a connection judging signal generator 10a, 10b are provided on each ends of the LED lighting device 3. A detection means 14a, 14b and a measuring resistor 13a, 13b is provided on each end of the LED lamp 7. They are effective even if they are only provided on either side in the LED lighting device 3 and the LED lamp 7, but it is safer if they are provided on both sides.

In this example explained in connection with Embodiment 1, the outputs of the connection judging signal generators 10a and 10b use a signal obtained by dividing a wide voltage using resistors. Here, for example, a fixed current source may be used, in which case the detection can be performed more precisely. Furthermore, a signal of a specific frequency may be used and, correspondingly, not a resistance but a capacitor may be used as an element for setting the impedance on the LED lamp side.

Embodiment 2

Figure 7:
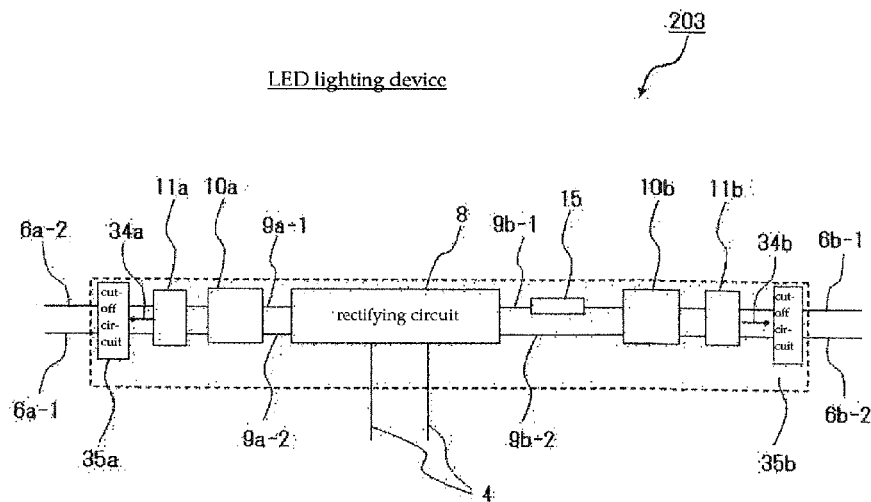
FIG. 7 shows Embodiment 2 and is a block diagram showing the circuit arrangement of a LED lighting device 203.
Figure 8:
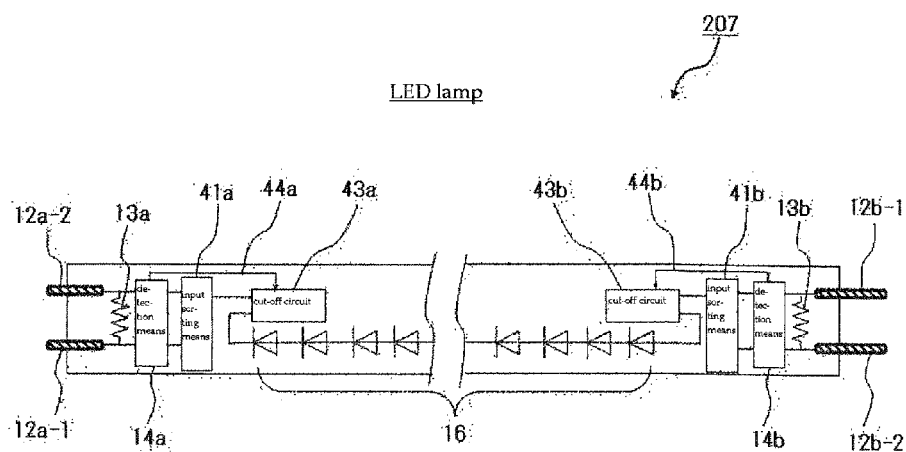
FIG. 8 shows Embodiment 2 and it shows the schematic structure of a LED lamp 207.
Figure 9:
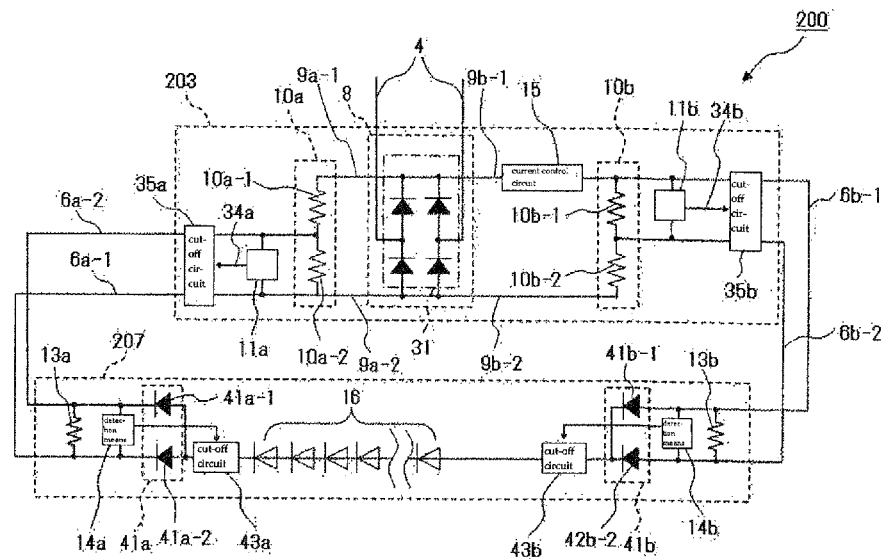
FIG. 9 shows Embodiment 2 and is a schematic circuit diagram showing the whole LED illumination system 200.

FIGS. 6-9 show Embodiment 2. FIG. 6 shows the LED illumination system 200. FIG. 7 is a block diagram showing the circuit arrangement of the LED lighting device 203. FIG. 8 shows the schematic structure of the LED lamp 207. FIG. 9 is a schematic circuit diagram showing the whole LED illumination system 200.

As shown in FIG. 6, just as in the LED illumination system 100, the LED illumination system 200 is configurated in such a manner that the LED lighting device 203 is installed in the existing straight-tube fluorescent lamp luminaire 1, the input electric wires 4 which are connected to the commercial power supply and to the existing ballast 2 (fluorescent lamp lighting device), and the in total four output electric wires 6 which are connected between the ballast 2 and the sockets 5, are removed and re-connected to the LED lighting device 203, and the LED lamp 207 (hereinafter sometimes referred to merely as "lamp") is connected to the existing sockets 5.

The LED illumination system 200 differs from the LED illumination system 100 in the LED lighting device 203 and the LED lamp 207.

As shown in FIG. 7, the LED lighting device 203 comprises the rectifying circuit 8, the connection judging signal generators 10a, 10b, the voltage measurement and cut-off signal generation circuits 11a, 11b, the cut-off circuits 35a, 35b, and the current control circuit 15.

In the LED lighting device 203, as shown in FIG. 7, for example, the input electric wires 4 accomodating an AC of 100 V are initially connected to the rectifying circuit 8, and the electric power is converted into a direct current to be outputted to the intermediate output electric wires 9a-1, 9a-2, 9b-1 and 9b-2 on both sides in FIG. 7.

The current control circuit 15 is electrically connected between the rectifying circuit 8 and the connection judging signal generator 10b and controls the current, i.e. the electric power, flowing through the LEDs 16 with the help of a fixed current circuit or a current limiting resistor.

As shown in FIG. 8, the LED lamp 207 side does not include the current control circuit 15 but comprises the LEDs 16 and the safety circuits, namely the measuring resistors 13a, 13b, the detection means 14a, 14b, the input sorting circuits 41a, 41b, and the cut-off circuits 43a, 43b.

As shown in FIG. 9, the LED illumination system 200 comprises the LED lighting device 203 and the LED lamp 207. The rectifying circuit 8 and the connection judging signal generators 10a, 10b of the LED lighting device 203 as well as the input sorting circuits 41a, 41b of the LED lamp 207 are the same as those of the LED illumination system 100 in FIG. 4.

The operation of lighting the LEDs 16 is identical to that of Embodiment 1, provided, however, that the current control circuit 15 on the LED lamp 7 side in Embodiment 1 is provided in the LED lighting device 203. According to one example where the current control circuit 15 is a fixed current circuit, the conductive state is realized in case the current at the time of lighting is designed as e.g. 20 W, until 0.2 A (0.2×100=20 W) is reached, and in case it is designed as 40 W, until 0.4 A (0.4×100=40 W) is reached. According to an example where the current control circuit 15 is a resistor, in case the voltage drop caused by the resistor is designed as 10 V (10% of 100 V), the resistance values are 50Ω and 25Ω for 20 W and 40 W, respectively.

Immediately after the power supply is turned on, the cut-off circuits 35a, 35b, 43a and 43b are in the cutoff state. Even if only one cut-off circuit is in the cutoff state, the current does not flow through the main part comprising the output electric wires 6a-1, 6b-1, the LEDs 16, etc. during that period. In this state, if the resistance values of the voltage-dividing resistors 10a-1, 10a-2, 10b-1, 10b-2 and the measuring resistors 13a, 13b are set to those in FIG. 5, the flowing current is about 0.001 A (<100 V/Rdi1=100/90,000≈0.001) in the example where the above control circuit is a fixed current circuit. Therefore, the fixed current circuit of the current control circuit 15 becomes conductive. In the example where the current control circuit 15 is used as the above resistor, the resistance is very small in comparison with Rdi1, etc. In either case, there is hardly any change compared to the state where the current control circuit 15 is not included.

On the other hand, while the lamp is lit, i.e. all of the four cut-off circuits 35a, 35b, 43a, 43b are in the conductive state, the voltage drop caused by the current control circuit 15 is about 10% of the power supply voltage in any system in the above example. Therefore, for the right-side circuit in FIG. 9, the voltage applied to the voltage-dividing resistors 10b-1 and 10b-2 is reduced by 10%, and the current flowing through the measuring resistor 13b decreases by 10%. Thus, the voltages detected by the detection means 14b on the LED lamp 207 side and the voltage measurement and cut-off signal generation circuits 11a, 11b on the LED lighting device 203 side are reduced by 10%. Thus, according to one example, the minimum value of the cut-off judging voltage is lowered by 10%. On the other hand, the left-side circuit in FIG. 9 is identical to the one in Embodiment 1. Any side operates in the same way as Embodiment 1.

Embodiment 3

Figure 10:
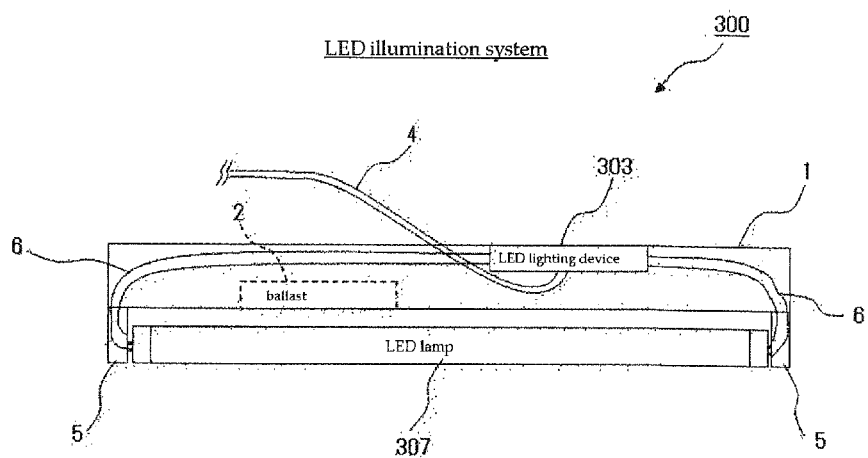
FIG. 10 shows Embodiment 3 and it shows a LED illumination system 300.
Figure 11:
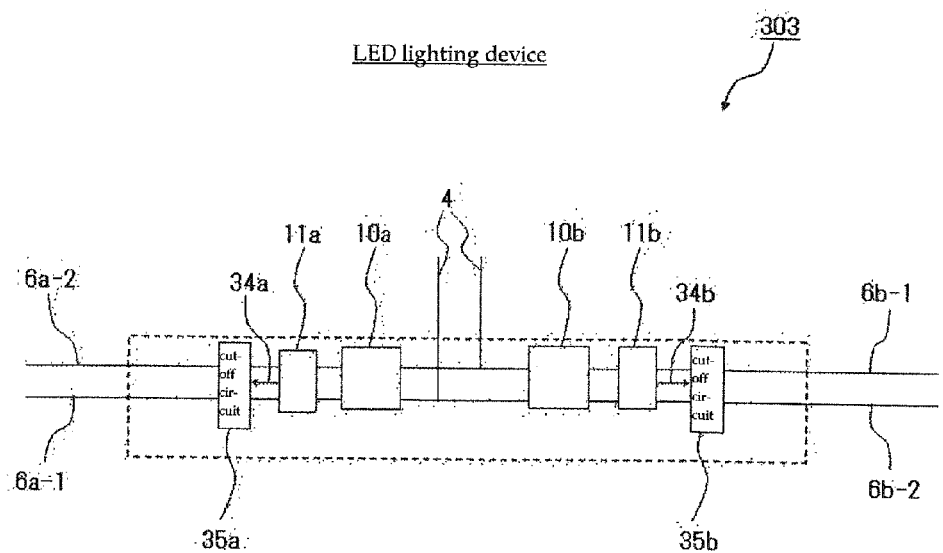
FIG. 11 shows Embodiment 3 and is a block diagram showing the circuit arrangement of a LED lighting device 303.
Figure 12:
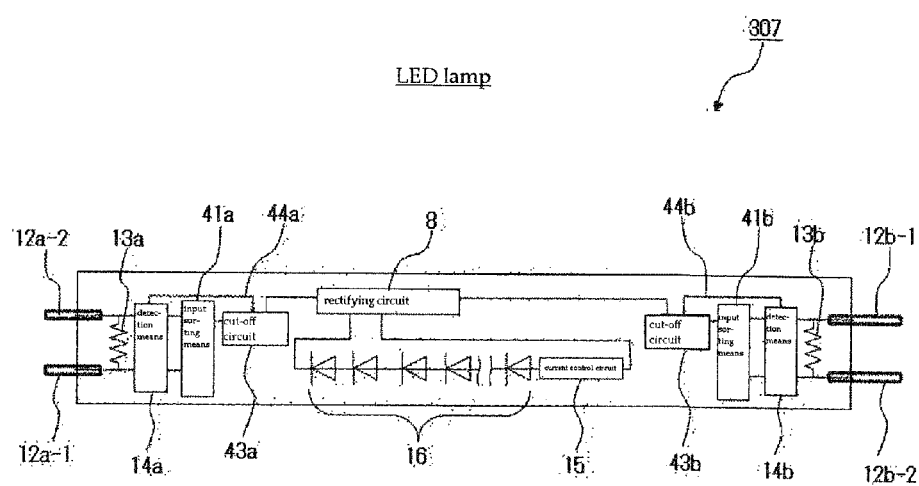
FIG. 12 shows Embodiment 3 and it shows the schematic structure of a LED lamp 307.
Figure 13:
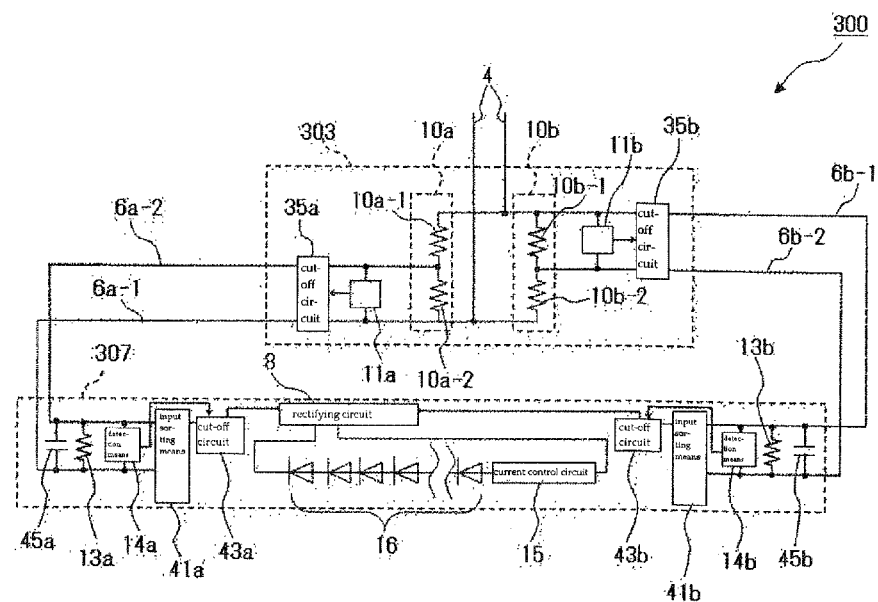
FIG. 13 shows Embodiment 3 and is a schematic circuit diagram showing the whole LED illumination system 300.
Figure 14:
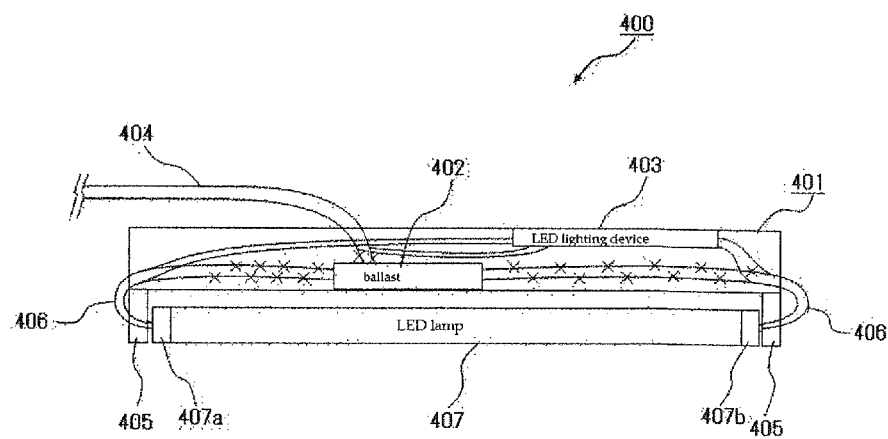
FIG. 14 shows a conventional LED illumination system 400.

FIGS. 10-13 show Embodiment 2. FIG. 10 shows the LED illumination system 300. FIG. 11 is a block diagram showing the circuit arrangement of the LED lighting device 303. FIG. 12 shows the schematic structure of the LED lamp 307. FIG. 13 is a schematic circuit diagram showing the whole LED illumination system 300.

As shown in FIG. 10, just as in the LED illumination system 100, the LED illumination system 300 is configured in such a manner that the LED lighting device 303 is installed in the existing straight-tube fluorescent lamp luminaire 1, the input electric wires 4 which are connected to the commercial power supply and to the existing ballast 2 (fluorescent lamp lighting device) and the in total four output electric wires 6 which are connected between the ballast 2 and the sockets 5 are removed and re-connected to the LED lighting device 303, and the LED lamp 307 (hereinafter sometimes referred to merely as "lamp") is connected to the existing sockets 5.

The LED illumination system 300 differs from the LED illumination system 100 in the LED lighting device 303 and the LED lamp 307.

As shown in FIG. 11, the LED lighting device 303 comprises the connection judging signal generators 10a, 10b, the voltage measurement and cut-off signal generation circuits 11a, 11b, and the cut-off circuits 35a, 35b.

As shown in FIG. 12, the rectifying circuit 8 and the current control circuit 15 are provided in the LED lamp 307. Thus, for the output electric wires 6a-1, 6a-2, 6b-1 and 6b-2 of the LED lighting device 303, the alternating current is used as it is. In particular, the output electric wires 6a-1 and 6b-1 accommodate a commercial voltage of a AC of 100 V as it is.

As shown in FIG. 13, the output electric wires 6a-1, 6a-2, 6b-1 and 6b-2 are connected to the bases of the LED lamp 7 via the sockets 5. Furthermore, the measuring resistors 13a, 13b, the RF conduction capacitors 45a, 45b and the detection means 14a, 14b are connected in parallel and connected to the rectifying circuit 8 via the input sorting circuits 41a, 41b and the cut-off circuits 43a, 43b. While the voltage inputted into the rectifying circuit 8 is kept at an AC of 100 V, it is rectified here and further smoothed in some cases to be outputted to the series circuit of the current control circuit 15 and the LEDs 16. Then, because of the controlled direct current, the LEDs 16 emit light.

As in Embodiment 1, there is one example where the connection judging signal generators 10a and 10b consist of the voltage-dividing resistors 10a-1, 10a-2, 10b-1 and 10b-2 and, since the input is an AC of 100 V, an alternating current is outputted. In case the cut-off circuits 35a and 35b are in the conductive state, they are connected to the measuring resistors 13a and 13b via the output electric wires 6a-1, 6a-2, 6b-1 and 6b-2. Consequently, for the inputted AC voltage, voltages that are determined independently on both ends (the left and right sides in FIG. 13) by three resistances and one capacitor, i.e. the voltage-dividing resistors 10a-1, 10a-2, the measuring resistor 13a and the RF conduction capacitor 45a on the left side in FIG. 13 and the voltage-dividing resistors 10b-1, 10b-2, the measuring resistor 13b and the RF conduction capacitor 45b on the right side, are generated at the measurement positions of the voltage measurement and cut-off signal generation circuits 11a, 11b and the detection means 14a, 14b. The voltage measurement and cut-off signal generation circuits 11a, 11b and the detection means 14a, 14b are AC voltmeters in this example.

For these voltage-dividing resistors 10a-1, 10a0-2, 10b-1, 10b-2 and these measuring resistors 13a, 13b, the resistors of Embodiment 1 are used as they are. Furthermore, the RF conduction capacitors 45a, 45b are set to such capacitances that conduction hardly takes place at commercial frequencies, so that the DC voltage is replaced with the effective value of the AC voltage, and the measurement is performed for this value.

Therefore, in case a straight-tube fluorescent lamp is mistakenly attached to the LED lighting device 303, the same workings as in Embodiment 1 take place and the cut-off circuits 35a, 35b break the circuits. Therefore, accidents such as heat generation and smoke emission do not occur in the straight-tube fluorescent lamp. As explained later, it is possible that the RF conduction capacitors 45a and 45b lower the voltage by about 10%, which can be neglected in certain cases. In cases where it cannot be neglected, particularly the minimum value of the range from 6.0 V to 12.0 V where the cut-off signal is not generated, should be lowered by about 10% (5.4 V-12.0 V), depending on the capacitances of the RF conduction capacitors 45a and 45b.

On the other hand, in case the LED lamp 307 is mistakenly attached to the original straight-tube fluorescent lamp luminaire 1 in which the ballast 2 (fluorescent lamp lighting device) has not been replaced with the LED lighting device 303, the detection means 14a and 14b detect the voltage applied to the filament of the straight-tube fluorescent lamp, as it is.

One example will be explained below for the type for a tube length of 1198 mm. In case the ballast 2 (fluorescent lamp lighting device) is a glow-tube type, about 200 V are applied to the terminals on both ends of the lamp, and the discharge lines of the glow tube and the measuring resistors 13a, 13b at both ends become serial. The discharge voltage of the glow tube is about 150 V and the voltages across the measuring resistors 13a and 13b are about 25 V, respectively. Since, as in Embodiment 1, the cut-off signal is not generated in the range from 6.0 V to 12.0 V, a cutting-off is carried out.

In a fluorescent lamp lighting device of a rapid start type, a filament transformer independently generates a voltage for heating the filament and applies it to the filament. JIS C7617-2 stipulates that this voltage is from 3.4 V to 4.2 V. Thus, this value deviates from the range from 6.0 V to 12.0 V where the cut-off signal is not generated. Therefore, the circuit is broken.

In case the fluorescent lamp lighting device is an inverter type, it is connected to something which is not a filament, which is why a wide range of voltages may be generated. Unless the RF conduction capacitors 45a and 45b are provided, the value of this voltage may possibly be within the range from 6.0 V to 12.0 V where the cut-off signal is not generated.

The RF conduction capacitors 45a and 45b are provided to lower the voltages in the detection means 14a and 14b in case the above capacitors are connected to a circuit of a high frequency of at least 10 kHz. In one example, 0.02 µF is used. In this case, at 60 Hz, the resistance corresponds to 133 kΩ. In case of 20 kHz, which is the lowest frequency of a normal inverter, the resistance is calculated as 400Ω (resistance=½ πfC, where f indicates frequency and C indicates capacitance).

The parallel measuring resistors 13a and 13b are 15Ω in one example. At 60 Hz, the deviations caused by the capacitors are about 10%, and the voltages across the resistors are lowered by about 10%. On the other hand, in case of an inverter, i.e. at least 20 kHz, the current flows through the capacitors almost completely. Therefore, the voltages across the resistances are at most 3% (<400 Ω/15000Ω). Even if 20 V are designed to be applied to the filament, the voltage is about 0.6 V (20×3%=0.6 V). This deviates from the range from 6.0 V to 12.0 V where the cut-off signal is not generated, and the circuit is broken.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

EXPLANATION OF REFERENCE SYMBOLS 1, 401 . . . straight-tube fluorescent lamp luminaire
2, 402 . . . ballast
3, 203, 303, 403 . . . LED lighting device
4, 404 . . . input electric wires
5, 405 . . . sockets
6, 6a-1, 6a-2, 6b-1, 6b-2, 406 . . . output electric wires
7, 207, 307, 407 . . . LED lamp
7a, 7b, 407a, 407b . . . bases
8 . . . rectifying circuit
9a-1, 9a-2, 9b-1, 9b-2 . . . intermediate output electric wires
10a, 10b . . . connection judging signal generators
10a-1, 10a-2, 10b-1, 10b-2 . . . voltage-dividing resistors
11a, 11b . . . voltage measurement and cut-off signal generation circuits
12a-1, 12a-2, 12b-1, 12b-2 . . . pins
13a, 13b . . . measuring resistors
14a, 14b . . . detection means
15 . . . current control circuit
16 . . . light emitting diode
31 . . . diode bridge
34a, 34b . . . signal lines
35a, 35b, 43a, 43b . . . cut-off circuits
41a, 41b . . . input sorting circuits
41a-1, 41a-2, 41b-1, 41b-2 . . . diodes
44a, 44b . . . cut-off signal lines
45a, 45b . . . RF conduction capacitors
100, 200, 300, 400 . . . LED illumination system

The invention claimed is:

1. A light emitting diode illumination system, wherein a light emitting diode lighting device is installed in an existing straight-tube fluorescent lamp luminaire, input electric wires connected to a commercial power supply and output electric wires connected to an existing socket, all wires being connected to the existing fluorescent lamp luminaire, are removed and re-connected to the light emitting diode lighting device, and a light emitting diode lamp is connected to the socket, wherein either inter-terminal section on the ends of the light emitting diode lamp is referred to as inter-terminal section A; the characteristic of an output from the light emitting diode lighting device connected to an inter-terminal section A is different from that for an existing fluorescent lamp lighting device; and the light emitting diode lamp is provided with lighting device output detection means for detecting the output from the light emitting diode lighting device and also with protection means for cutting off an input to the light emitting diode lamp when the output detected by the lighting device output detection means is outside of a predetermined range the impedance of the inter-terminal sections A of the light emitting diode lamp is different from the impedance of a fluorescent lamp, both in a normal state and at the end of its life; impedance detection means for directly or indirectly detecting the impedance of the inter-terminal sections A are provided on the sides of the light emitting diode lighting device corresponding to the inter-terminal sections A; and, further, the light emitting diode lighting device is provided with protection means for cutting off the output of the light emitting diode lighting device when the impedance of an inter-terminal section A detected by the impedance detection means is outside of a predetermined range.

2. A light emitting diode lamp with a base provided with a pair of metal pins on both ends of a slender rod-type body, inside which or on the surface of which light emitting diodes are arranged in series; wherein: either inter-terminal section on the ends is referred to as inter-terminal section A; the impedance of the inter-terminal sections A is different from the impedance of a fluorescent lamp, both in a normal state and at the end of its life; lighting device output detection means are provided for detecting an output from the light emitting diode lighting device, and protection means are provided for cutting off an input to the light emitting diode lamp when the output detected by the lighting device output detection means is outside of a predetermined range the impedance of the inter-terminal sections A of the light emitting diode lamp is different from the impedance of a fluorescent lamp, both in a normal state and at the end of its life; impedance detection means for directly or indirectly detecting the impedance of the inter-terminal sections A are provided on the sides of the light emitting diode lighting device corresponding to the inter-terminal sections A; and, further, the light emitting diode lighting device is provided with protection means for cutting off the output of the light emitting diode lighting device when the impedance of an inter-terminal section A detected by the impedance detection means is outside of a predetermined range.

3. The light emitting diode lamp according to claim 2, wherein a resistor of 500Ω to 500 KΩ provided between the two pins of the base on at least one end.

4. The light emitting diode lamp according to claim 2, which operates with a DC voltage or current from the light emitting diode lighting device, has detection means for detecting whether a voltage applied between the input terminals is an alternating current or a direct current, and has protection means for cutting off if it is an alternating current.

5. The light emitting diode lamp according to claim 3, which has detection means for an applied voltage of the inter-terminal section A connected to the resistor, and protection means for cutting off if the applied voltage deviates from a voltage calculated from a current made to flow by the light emitting diode lighting device and from any resistance value in the range of the resistor.

6. A light emitting diode lighting device, wherein it has output terminals connected to the base of the light emitting diode lamp; at least part of the output from the output terminals is different from an output of a fluorescent lamp lighting device; it has impedance detection means for measuring the impedance between the terminals of the light emitting diode lamp; and it has protection means for cutting off the output if the impedance between the terminals of the light emitting diode lamp detected by the impedance detection means is outside of a predetermined range the impedance of the inter-terminal sections A of the light emitting diode lamp is different from the impedance of a fluorescent lamp, both in a normal state and at the end of its life; impedance detection means for directly or indirectly detecting the impedance of the inter-terminal sections A are provided on the sides of the light emitting diode lighting device corresponding to the inter-terminal sections A; and, further, the light emitting diode lighting device is provided with protection means for cutting off the output of the light emitting diode lighting device when the impedance of an inter-terminal section A detected by the impedance detection means is outside of a predetermined range.

7. The light emitting diode lighting device according to claim 6, which outputs an output with a voltage varying depending on a fixed current or a load, at least at the time when it is activated, between at least one pair of terminals connected to a socket, and which has detection means for the voltage between the terminals and protection means for cutting off the output if the voltage between the terminals detected by the detection means is outside of a predetermined range.

8. A light emitting diode illumination system comprising: an LED lamp; a straight-tube fluorescent lamp luminaire housing configured to hold the LED lamp; wherein the LED lamp includes: a luminaire output detection means for detecting the voltage supplied to the LED tamp; and a protection means for cutting off the voltage to the LED lamp when the voltage by the output detection means is outside of a predetermined range the impedance of the inter-terminal sections A of the light emitting diode lamp is different from the impedance of a fluorescent lamp, both in a normal state and at the end of its life; impedance detection means for directly or indirectly detecting the impedance of the inter-terminal sections A are provided on the sides of the light emitting diode lighting device corresponding to the inter-terminal sections A; and, further, the light emitting diode lighting device is provided with protection means for cutting off the output of the light emitting diode lighting device when the impedance of an inter-terminal section A detected by the impedance detection means is outside of a predetermined range.

* * * * *